Jan. 8, 1924.    1,480,034
J. H. WAGENHORST
WHEEL AND METHOD OF MAKING THE SAME
Filed Nov. 15, 1918     2 Sheets-Sheet 1

Inventor
J. H. Wagenhorst
By Hull Smith Brock & West
Attys

Jan. 8, 1924.    1,480,034
J. H. WAGENHORST
WHEEL AND METHOD OF MAKING THE SAME
Filed Nov. 15, 1918    2 Sheets-Sheet 2
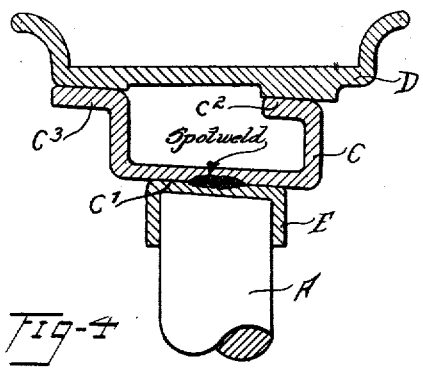
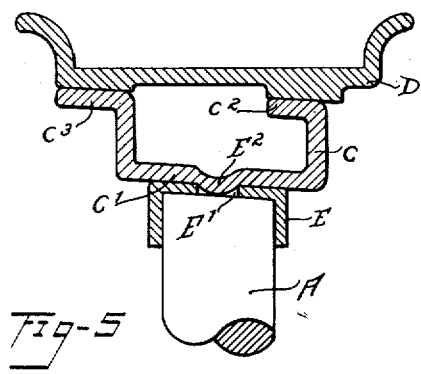
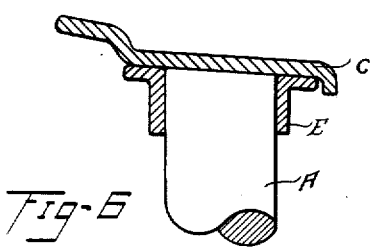
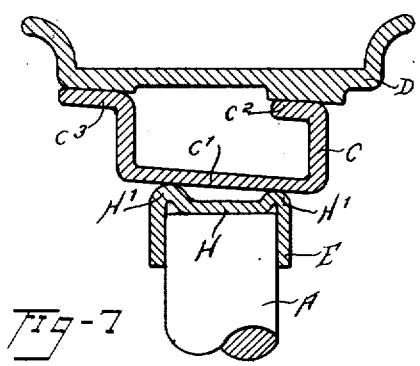
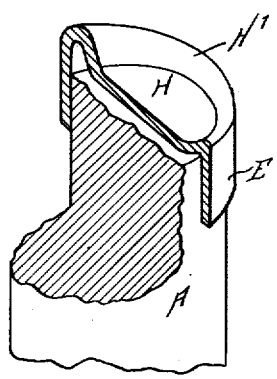
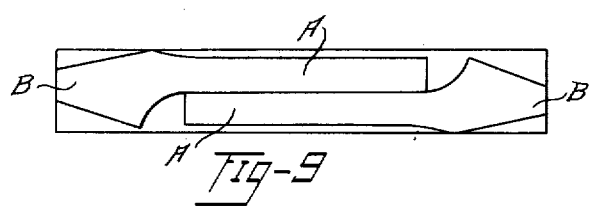

Patented Jan. 8, 1924.

1,480,034

UNITED STATES PATENT OFFICE.

JAMES H. WAGENHORST, OF AKRON, OHIO.

WHEEL AND METHOD OF MAKING THE SAME.

Application filed November 15, 1918. Serial No. 262,649.

*To all whom it may concern:*

Be it known that I, JAMES H. WAGENHORST, a citizen of the United States, residing at Akron, in the county of Summit and State of Ohio, have invented a certain new and useful Improvement in Wheels and Methods of Making the Same, of which the following is a full, clear, and exact description, reference being had to the accompanying drawings.

This invention relates generally to wheels and more particularly to a wheel composed of wooden spokes and a metallic felly. This invention also relates to the method of making such wheels.

The object of the invention is to provide a wheel composed of wooden spokes and a metallic felly, the inner ends of the spokes being tapered in the usual manner and the continuous metallic felly applied laterally to the outer ends of such spokes, the wheel body as a whole being subjected to radial compression in the positioning of the felly upon the spokes thereby providing a thoroughly rigid wheel body in which all of the parts are thoroughly interlocked.

Another object of the invention is to provide a novel manner of cutting the spokes from billets whereby economy of wood is obtained.

Another object of the invention is to provide for the quick and efficient fastening of the felly to the spoke ends after said felly has been properly positioned upon said spoke ends.

Figure 1:
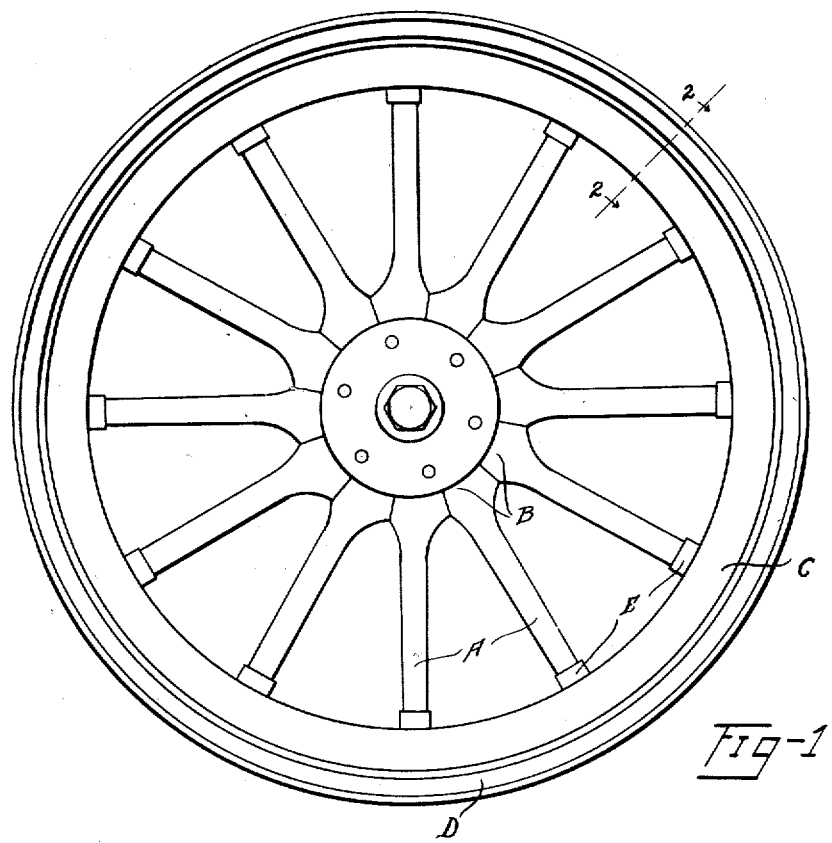
Figures 2, 3:
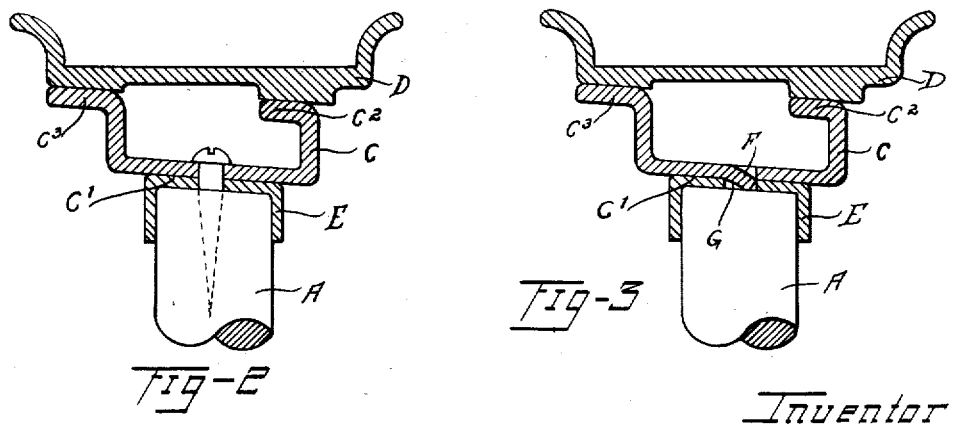

With these objects in view, and certain others, which will become apparent as the description proceeds, the invention consists in the novel features of construction and arrangement hereinafter fully described and pointed out in the appended claims, and the invention also consists in the novel method of arranging and assembling the several parts whereby a completed wheel is provided. In the drawings forming a part of this specification Fig. 1 is a side view of a wheel constructed in accordance with my invention; Fig. 2 is a detail sectional view of a spoke end cap and felly; Fig. 3 is a similar view showing one manner of locking the felly upon its spoke end; Figs. 4 and 5 are similar views showing modifications of such fastening means; Figs. 6 and 7 show modified forms of caps; Fig. 8 is a detail sectional perspective view of the modified cap shown in Fig. 7; and Fig. 9 is a plan view illustrating the method of cutting spokes from a wooden billet.

In carrying out my invention I employ any desired number of wooden spokes A, the ends of which are tapered, as shown at B so that when all of the spokes are assembled a central nave portion will be provided, the tapered sides of the several spokes contacting with each other.

In practice I prefer to cut two spokes from one billet of wood as most clearly shown in Fig. 9 and in this manner economize considerably in the use of wood.

The felly C is a continuous metallic ring preferably rolled from sheet metal, and flanged or channeled; that is, the felly is made up of a base portion $C'$ and inner flange or side $C^2$, and an outer flange or side $C^3$ and the outer ends of these flanges or sides can be bent inwardly, or inwardly and outwardly, or in any manner preferred, in order to provide the proper seats or bearing surfaces for a demountable tire carrying rim D which is to be applied to and fastened upon this metallic felly.

The base or bottom $C'$ of the felly is made sloping or inclined from the outer edge as shown; and in practice I prefer to arrange upon the outer end of each spoke a metallic cap E, the outer end of which is beveled, sloped or inclined upon the same angle and in the same direction as the base or bottom of the felly.

The method of making the wheel is as follows: The spokes A are assembled with their inner tapered ends contacting and are fastened together temporarily in any suitable manner.

The caps E are then applied to the spoke ends with their inclined ends sloping outwardly. The metallic felly C is then placed upon these capped spoke ends with the inclined or sloping base $C'$ thereof contacting with the inclined or sloping ends of the caps and said felly is then forced laterally with reference to said spoke ends until it has been brought into proper central position, and it will of course be understood that the felly C is forced laterally as a whole, so that the entire center of the wheel body will be simultaneously subjected to a uniform radial compression, thereby bringing all of the spokes into locked relation with each other and with the continuous inextensible metallic felly.

If desired, the felly could be held rigid, and the spokes with caps thereon forced into the said metallic felly, the operation being identically the same in both instances, that is, so long as there is a relative movement of the capped wooden spokes and the metallic felly laterally with reference to each other whereby the inclined faces of the cap ends and felly base is obtained, it is immaterial whether the felly is forced upon the spokes, or the spokes forced into the felly.

Various methods may be employed for locking or fastening the felly in its fixed position after it has been placed upon the capped spokes. If desired it could be spot welded, (Fig. 4). Another method would be to pass a short screw radially through the felly cap end and into the spoke as shown in Fig. 2. Another method would be to provide a small aperture E' in the end of the cap and drive a portion of the rim into said aperture as most clearly shown at E² in Fig. 5. In practice, however, it is preferred to push a short tongue F from the base of the felly and provide the cap with an opening G or indentation G and after the felly has been properly positioned, press the tongue inwardly into the opening or recess, the tongue extending outwardly and consequently locking the felly against outward movement and the inclination of the cap end and felly base would prevent its dislocation inwardly. This method is illustrated in Fig. 3.

It will be noted that inasmuch as a majority of the lateral strains are from the outside inwardly such strains would tend always to keep the felly firm upon the spoke end and consequently it is only necessary to take care of those strains or shocks which act from the inner side outwardly.

A wheel constructed in this manner and according to this method will be thoroughly rigid throughout, and yet if one or more spokes should become damaged they can be quickly and easily removed and a new one inserted, it being understood that after a spoke and its cap are removed, the locking tongue in the base of the felly could be pressed back so as to provide a smooth surface in order that the cap end and felly base could be brought again into proper position and then the tongue could be punched inwardly again.

The spoke ends can be made sloping to fit into the metallic caps or if desired the spoke ends can be cut perfectly square as shown in Fig. 7, and the central portion H of the cap can be depressed to provide a flat bearing surface for the spoke end to contact therewith, the edge portions H' of the cap being inclined or sloping so as to provide the proper wedging engagement between the cap and the base or bottom of the felly. It will be understood that the sides of the felly can be turned outwardly as shown in Figs. 1 to 5 or the inner side or flange can be turned outwardly and outer flange or side turned inwardly as shown in Fig. 6.

It will thus be seen that I provide a wheel comprising a plurality of wooden spokes and a continuous inextensible metallic felly which is applied laterally to the spoke ends, and in such application not only becomes firmly locked in contact with said spoke ends but also exerts a uniform and simultaneous radial compression upon the spokes so as to provide the proper interlocked wheel body.

Having thus described my invention, what I claim is:—

1. As a new article of manufacture, a wheel comprising a plurality of wooden spokes, metallic caps upon the outer ends of said spokes, an endless wheel member arranged upon the capped end of said spokes, a portion of said wheel member being depressible into locked engagement with the end of said caps.

2. As a new article of manufacture, a wheel comprising a plurality of wooden spokes, metallic caps upon the outer ends of said spokes, and a wheel member forced upon the ends of said caps, the base of said wheel member and the ends of the caps being so shaped as to engage each other in permanent relation when said wheel member is forced upon the cap ends.

3. As a new article of manufacture, a wheel comprising a plurality of spokes, of metallic caps upon the outer ends of said spokes and an endless wheel member forced upon the ends of said caps, one of said parts being radially upset to prevent displacement.

4. As a new article of manufacture, a wheel comprising a plurality of wooden spokes having their inner ends in contact, metallic caps upon the outer ends of said spokes, the ends of said caps being inclined, an endless metallic felly having an inclined base, said felly being laterally positioned upon the inclined spoke caps, a portion of said felly base being depressible into locked engagement with the end of cap.

5. As a new article of manufacture, a wheel comprising a plurality of wooden spokes arranged with their inner ends in contact, metallic caps upon the ends of said spokes, each cap having an inclined surface, and an endless metallic felly having an inclined base adapted to be laterally wedged upon the inclined surfaces of the spoke caps the base of said felly having an integral tongue adapted to be pressed into engagement with the cap to prevent displacement of the felly.

6. As a new article of manufacture, a wheel comprising a plurality of wooden spokes arranged with their inner ends in contact, metallic caps upon the ends of said spokes, and an endless metallic felly laterally wedged upon the spokes, the spoke caps and felly having inclined contacting surfaces whereby the spokes are placed under radial compression and the felly tensioned as said felly is laterally positioned upon the spokes.

In testimony whereof, I hereunto affix my signature.

JAMES H. WAGENHORST.